March 13, 1962 J. E. DURKEE 3,025,394
SUPER-REGENERATIVE TRANSISTOR DETECTOR
Filed May 15, 1958
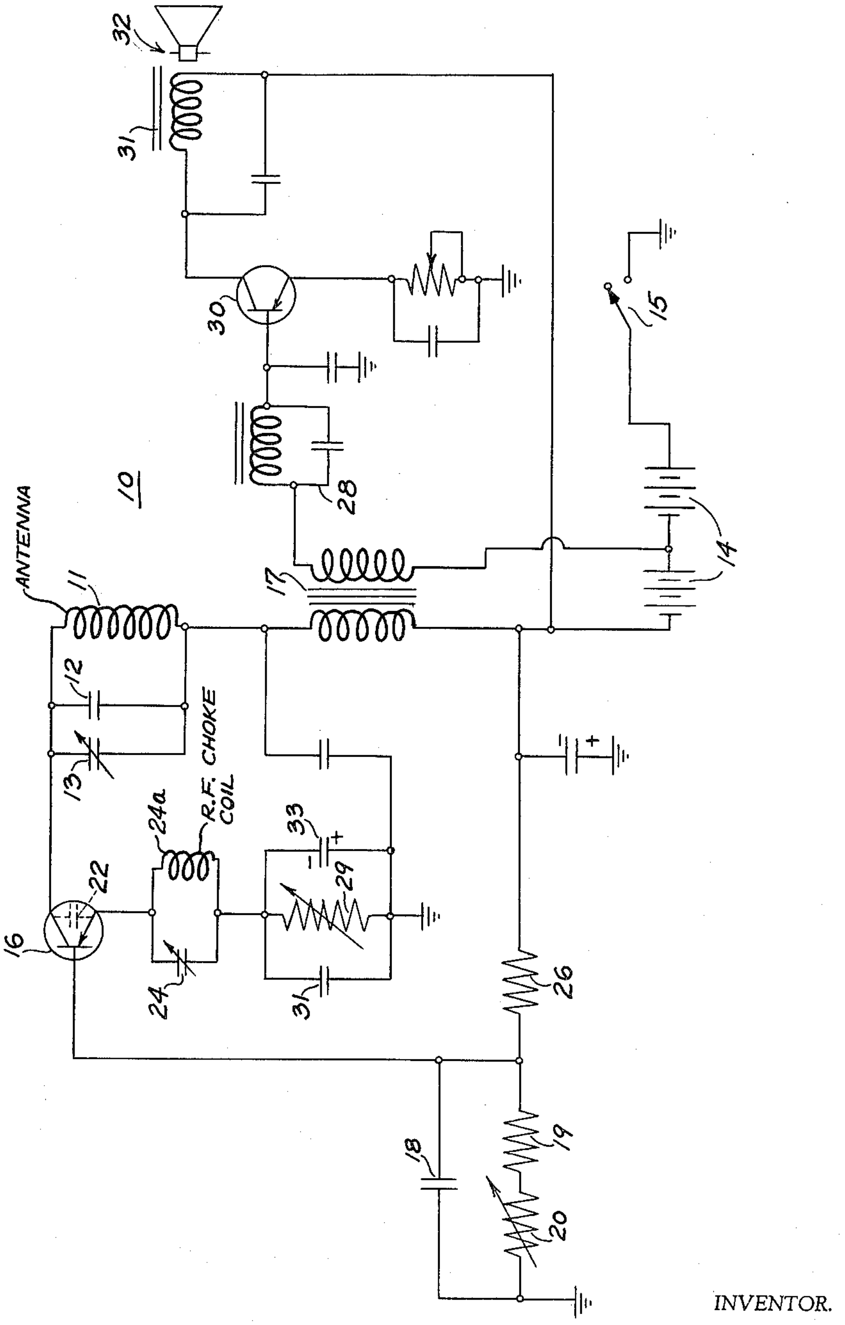
INVENTOR.
JOHN E. DURKEE
BY T. L. Styner
ATT'Y.

United States Patent Office 3,025,394
Patented Mar. 13, 1962

3,025,394

SUPER-REGENERATIVE TRANSISTOR DETECTOR

John E. Durkee, Conesus, N.Y., assignor to General Dynamics Corporation, Rochester, N.Y., a corporation of Delaware Filed May 15, 1958, Ser. No. 735,611
2 Claims. (Cl. 250—20)

The present invention relates to radio receivers and it relates more particularly to a new and improved detector circuit which is both efficient and reliable in operation and which utilizes relatively few components so as to be small in size, simple in construction, and inexpensive to manufacture.

Radio receivers which are sufficiently small to fit in one's pocket or, perhaps, to be strapped to the wrist, have many important uses such, for example, as a primary component in paging systems of the type presently used in industrial plants, hospitals and the like. Moreover, such receivers can be carried by firemen during the fighting of a fire to provide direct communication between a number of firemen and a central station from which fire fighting directions are given to the individual firemen. In this latter application the receivers must be so small in size and light in weight as not to interfere, in any appreciable way, with the activities of the firemen, but they must also be extremely reliable in operation to insure that the communication links between the central station and the individual firemen is maintained at all times.

In order to minimize the number and size of the circuit components used in the receiver, it would be desirable to employ a super-regenerative detector circuit using a transistor. The advantage of a super-regenerative detector circuit is that a maximum gain is achieved with the smallest number of components, and the provision of the transistor reduces the size of the receiver because a transistor is considerably smaller than a comparable tube, and a very small battery may be employed because of the relatively low power drain of the transistor.

Therefore, an object of the present invention is to provide a new and improved radio receiver.

Another object of the present invention is to provide a new and improved radio receiver which is operable in the UHF frequency band.

A further object of the present invention is to provide a new and improved super-regenerative detector circuit.

A further object of the present invention is to provide a new and improved super-regenerative detector circuit using a transistor as the nonlinear impedance element.

Another object of the present invention is to provide a new and improved quench circuit for use in conjunction with a radio receiver employing a super-regenerative detector.

Briefly, the above and further objects are realized in accordance with the present invention by operating a transistor detector at a sufficiently high frequency that the internal capacitance between the electrodes of the transistor provides sufficient regenerative feedback to cause the transistor circuit to oscillate, and reducing the amplitude of the feedback signal below the oscillatory level by means of a capacitor connected between one of the electrodes and ground. In this way the internal capacitance of the transistor is used to provide the regenerative feedback path, but the strength of the signal is maintained below the oscillatory level by the external capacitance which bleeds off a portion of the feedback signal.

In accordance with another aspect of the invention, the regenerative detector circuit is made super-regenerative by incorporating therein a relaxation type oscillator circuit to provide the quench frequency signal which periodically causes the detector circuit to oscillate. Operation of the detector in this manner thus greatly increases its gain and reduces the number of additional stages of audio amplification which are required for driving the speaker.

Many other objects and advantages of the present invention will become apparent from a consideration of the following detailed description when taken in conjunction with the following drawing which is a schematic circuit diagram of a radio receiver embodying the present invention.

Referring now to the drawing, a radio receiver 10 comprises an antenna coil 11 which intercepts an amplitude moduiated radio signal to develop therein a current varying in accordance with the radio signal. A fixed capacitor 12 and an adjustable trimmer capacitor 13 are connected in parallel across the antenna coil 11 to provide the usual tank circuit which is adjustably tunable to select a desired signal from the various radio frequency signals which are intercepted by the antenna coil 11. Where the radio receiver 10 is designed for operation at a single frequency, the capacitor 13 is not ordinarily adjusted during normal use of the receiver but should be adjusted at the factory.

The receiver 10 is energized by a battery 14 having the positive pole thereof connected to ground through a receiver on-off switch 15. The switch 15 is a simple, single throw, single pole switch which is shown in the "off" position. Therefore, with the switch 15 in the "on" position, the antenna circuit is connected between the negative pole of the battery 14 and the collector of a PNP junction transistor 16 whose base is connected to the positive pole of the battery 14 through the ground connection. As shown, the antenna coil 11 is connected to the negative pole of the battery 14 through the primary winding of an audio frequency coupling transformer 17 and the base of the transistor 16 is connected to ground through the parallel circuit comprising a capacitor 18 and a pair of resistors 19 and 20. If the receiver 10 is to be used in a system employed in fighting fires, it is desirable that it operate in the UHF frequency range such as, for example, at a frequency of 41.6 megacycles which is the frequency allotted by the Federal Communications Commission for this purpose. Accordingly, it is necessary to select a transistor 16 which may be operated at this high frequency and it has been found that certain types of transistors such, for example, as the surface barrier transistors satisfy this requirement, but the internal capacitance between the collector and the emitter thereof, which is designated in the drawing by the number 22, provides sufficient feedback to cause oscillation of the transistor 16. For voice transmission purposes, this is, of course, undesirable, and therefore, it is necessary to prevent the transistor 16 and its associated circuit components from continuously oscillating at these high UHF frequencies. Consequently, and in accordance with the present invention, the variable capacitor 24 is connected between ground and the emitter of the transistor 16 thereby to bleed off an adjustable portion of the signal which is fed back from the collector to the emitter through the internal capacitance 22. That is, capacitances 22 and 24 constitute a voltage divider and the carrier potential across capacitance 22, and hence the degree of carrier feedback, may be controlled by properly selecting the value of capacitance 24. A direct current path around the capacitor 24 is provided preferably by a high inductance coil 24*a*. Continuous oscillation of the detector circuit may thus be prevented by properly adjusting the capacitor 24. If it were desired to operate the detector circuit including the transistor 16 as a regenerative detector, the value of the capacitor 24 would be adjusted such that the gain of the feedback loop including the internal capacitance 22 were slightly less than unity thereby to provide maximum gain without any oscillation.

While a substantial amount of amplification may be provided by the detector 16 when it is operated regeneratively in this manner, it would be desirable to further increase the amplification thereof if such would reduce the required number of audio stage amplification. Consequently, in accordance with the present invention the gain of the detector is substantially increased by operating the transistor 16 super-regeneratively.

In order to periodically render the detector circuit oscillatory at a quench frequency which is substantially less than the signal frequency, a blocking type oscillator including the capacitor 18 is provided for periodically varying the potential at the base of the transistor 16 between a value at which the detector oscillates and a value at which it is stable. Considering the operation of the detector circuit of the present invention, assume that the switch 15 has been open for some time and is at this time initially closed. The capacitor 18 is discharged and the base of the transistor 16 is, therefore, at a negative potential determined by the values of the resistors 19, 20, and 26. The signal received by the antenna system is supplied to the emitter of the transistor 16 and is detected to develop the audio modulation voltage across the primary winding of the transformer 17. Because of the base of the transistor 16 is more positive than the collector, the detector does not immediately go into oscillation. However, as the capacitor 18 charges up, the potential of the base increases in a negative direction until the value is reached at which the detector 16 oscillates. When it does, the emitter-to-base current flows which quickly discharges the capacitor 18 thereby to increase the potential of the base above the value at which oscillation takes place. Oscillation is thus terminated and the capacitor again is gradually charged up to a value at which oscillation again occurs.

Because the capacitor 18 discharges through the emitter circuit to ground during oscillation of the transistor 16, an adjustable resistance 29 may be connected between ground and the emitter of the transistor 16 to control the quench frequency. The resistor 29 must, of course, be bypassed by a pair of capacitors 31 and 33 to connect the bottom of the capacitor 24 substantially at ground potential for bleeding off a portion of the UHF feedback signal.

The detected signal which, together with the received UHF signal appears in the collector circuit, is coupled through the transformer 17 and an LC resonant circuit 28 to an audio amplifier comprising a transistor 30 in the collector circuit of which is connected the voice coil 31 of a loud-speaker 32. The loud-speaker 32 is preferably contained in an ear plug to minimzie the power requirements of the receiver.

The present invention thus provides a super-regenerative detector circuit employing a transistor thereby to provide high gain with a minimum of components, which components are very small in size and provide a low current drain on the battery. Consequently, a small, reliable, and inexpensive radio receiver may be designed incorporating the detector and quench circuit of the present invention.

By way of illustration only, and not by way of limiting this application thereto, the following component values have been found to give efficient operation in a particular construction of the disclosed radio receiver.

| | |
|---|---|
| Transistor 16 | SB103. |
| Transistor 30 | 2N132. |
| Resistor 19 | 2700 ohms. |
| Variable resistor | 1200 ohms maximum. |
| Resistor 29 | 1 kilohm maximum. |
| Capacitor 12 | 62 micromicrofarads. |
| Capacitor 13 | 5–25 micromicrofarads. |
| Capacitor 18 | .005 microfarad. |
| Capacitor 24 | 5–25 micromicrofarads. |
| Capacitor 31 | .01 microfarad. |
| Capacitor 33 | 25 microfarads. |
| Capacitor in trap 28 | .01 microfarad. |
| Conductor in trap 28 | 10 millihenries. |

While there has been described what is at present considered to be a preferred embodiment of the invention, it will be understood that various modifications may be made therein which are within the true spirit and scope of the invention as defined in the appended claims.

What is claimed as new and desired to be secured by Letters Patent of the United States is:

1. A super-regenerative detector circuit comprising a transistor including base, collector, and emitter electrodes; an input circuit for modulated radio frequencies connected between said base and collector electrodes; an output circuit connected to said collector electrode; a regenerative circuit coupling said collector and emitter electrodes and consisting solely of the internal capacitance of said transistor; first capacitive means connected between said base electrode and reference ground and with means for controlling the bias on said base electrode; resistance means connected to said emitter electrode, said resistance means and the base-to-emitter path of said transistor providing a discharge path for said first capacitive means, the time constant of said resistance means and said first capacitive means substantially determining the quench frequency of said detector circuit; and second capacitive means shunting said resistance means to by-pass the signal supplied to said emitter electrode by said regenerative circuit, and a third capacitive means connected directly in series with said emitter electrode and with the inherent collector-to-emitter capacity of said transistor to control regenerative feedback from said emitter electrode to said collector electrode.

2. A super-regenerative detector circuit comprising a transistor including a first, a second and a third electrode, an input circuit for modulated radio frequencies connected between said first and said second electrodes, an output circuit connected to said second electrode; a regenerative circuit coupling said second and said third electrodes and consisting solely of the internal capacitance of said transistor; first capacitive means connected between said first electrode and reference ground and with means for controlling the bias on said first electrode; resistance means connected to said third electrode, said resistance means and the first-to-third electrode path of said transistor providing a discharge path for said first capacitive means, the time constant of said resistance means and said first capacitive means substantially determining the quench frequency of said detector circuit; and second capacitive means shunting said resistance means to by-pass the signal supplied to said third electrode by said regenerative circuit, and a third capacitive means connected directly in series with said third electrode and with the inherent second-to-third electrode capacity of said transistor to control regenerative feedback from said third electrode to said second electrode.

References Cited in the file of this patent

UNITED STATES PATENTS

| | | |
|---|---|---|
| 2,576,642 | Richman | Nov. 27, 1951 |
| 2,751,447 | Duncan | June 14, 1956 |
| 2,789,214 | Seargeant | Apr. 16, 1957 |
| 2,792,494 | Suran et al. | May 14, 1957 |

| | | |
|---|---|---|
| 2,821,625 | Price | Jan. 28, 1958 |
| 2,863,995 | Chow | Dec. 9, 1958 |
| 2,922,032 | Hass et al. | Jan. 19, 1960 |

OTHER REFERENCES

Pub. 2—Electronics, August 1953, pages 170–173, Junction Transistor Applications, by Sulzer.

Pub. 1—Transactions of The Institute of Radio Engineers, Professional Group on Electronic Devices, vol. ED–1, No. 2, pages 43–52, April 1954; A Point Contact Transistor VHF FM Transmitter, by D. E. Thomas.